United States Patent
Schmidt et al.

(10) Patent No.: US 9,577,243 B2
(45) Date of Patent: Feb. 21, 2017

(54) USE OF EXPANDED GRAPHITE IN LITHIUM/SULPHUR BATTERIES

(75) Inventors: Ruediger Schmidt, Paderborn (DE); Alexander Panchenko, Ludwigshafen (DE); Bastian Ewald, Ludwigshafen (DE); Philip Hanefeld, Cranford, NJ (US); Sorin Ivanovici, Heidelberg (DE); Helmut Moehwald, Annweiler (DE); Igor P. Kovalev, Vail, AZ (US)

(73) Assignee: Sion Power Corporation, Tucson, AZ (US)

( * ) Notice: Subject to any disclaimer, the term of this patent is extended or adjusted under 35 U.S.C. 154(b) by 882 days.

(21) Appl. No.: 13/700,696

(22) PCT Filed: May 26, 2011

(86) PCT No.: PCT/EP2011/058651
§ 371 (c)(1),
(2), (4) Date: Mar. 6, 2013

(87) PCT Pub. No.: WO2011/147924
PCT Pub. Date: Dec. 1, 2011

(65) Prior Publication Data
US 2013/0164635 A1    Jun. 27, 2013

Related U.S. Application Data

(60) Provisional application No. 61/349,229, filed on May 28, 2010, provisional application No. 61/349,232, filed on May 28, 2010.

(30) Foreign Application Priority Data

May 28, 2010 (EP) .................... 10164339
May 28, 2010 (EP) .................... 10164341

(51) Int. Cl.
  *H01M 4/02* (2006.01)
  *H01M 4/133* (2010.01)
  (Continued)

(52) U.S. Cl.
  CPC .......... *H01M 4/133* (2013.01); *H01M 4/136* (2013.01); *H01M 4/1397* (2013.01); *H01M 4/38* (2013.01);
  (Continued)

(58) Field of Classification Search
  CPC ...................................................... H01M 4/02
  See application file for complete search history.

(56) References Cited

U.S. PATENT DOCUMENTS

2004/0058246 A1    3/2004  Choi et al.
2007/0003837 A1*   1/2007  Nishimura .......... H01M 4/0404
                                                      429/232

(Continued)

FOREIGN PATENT DOCUMENTS

CN    201180026415.0    11/2015
EP       1 491 497 B1    11/2006
(Continued)

OTHER PUBLICATIONS

Office Action for CN 201180026415.0 mailed Apr. 30, 2015.
(Continued)

*Primary Examiner* — Jacob Marks
(74) *Attorney, Agent, or Firm* — Wolf, Greenfield & Sacks, P.C.

(57) ABSTRACT

The present invention relates to a solid composite for use in the cathode of a lithium-sulphur electric current producing cell wherein the solid composite comprises 1 to 75 wt.-% of expanded graphite, 25 to 99 wt.-% of sulphur, 0 to 50 wt.-% of one or more further conductive agents other than expanded graphite, and 0 to 50 wt.-% one or more binder, (Continued)

based on the total amount of the solid composite, a lithium-sulphur electric current producing cell comprising (i) a cathode comprising the solid composite, (ii) an anode and (iii) an electrolyte interposed between said cathode and said anode, and a process for preparing the solid composite comprising the steps (I) preparing a slurry comprising sulphur, expanded graphite, and optionally further components in a liquid medium by dispersing the sulphur, the expanded graphite, and optionally the further components in the liquid medium; (II) casting the slurry provided in step (I) on a substrate or placing the slurry provided in step (I) into a mold; and (III) removing some or all of the liquid medium from the slurry cast in step (II) to form a solid composite.

15 Claims, 2 Drawing Sheets

(51) Int. Cl.
  H01M 4/136    (2010.01)
  H01M 4/38     (2006.01)
  H01M 4/1397   (2010.01)
  H01M 4/04     (2006.01)
  H01M 4/62     (2006.01)
  H01M 10/052   (2010.01)

(52) U.S. Cl.
  CPC .......... *H01M 4/625* (2013.01); *H01M 4/0485* (2013.01); *H01M 4/621* (2013.01); *H01M 10/052* (2013.01); *Y02E 60/122* (2013.01)

(56) References Cited

U.S. PATENT DOCUMENTS

| | | | |
|---|---|---|---|
| 2009/0226809 A1* | 9/2009 | Vu | H01M 2/166 429/220 |
| 2009/0263727 A1* | 10/2009 | Josephs et al. | 429/329 |
| 2010/0303706 A1 | 12/2010 | Wallace et al. | |
| 2011/0260100 A1 | 10/2011 | Trukhan et al. | |
| 2012/0032109 A1 | 2/2012 | Konig et al. | |

FOREIGN PATENT DOCUMENTS

| | | |
|---|---|---|
| EP | 10164339 | 8/2010 |
| EP | 11723423.7 | 12/2013 |
| GB | 2078435 A | 1/1982 |
| JP | 57-27572 A | 2/1982 |
| JP | 2003-208897 A | 7/2008 |
| JP | 2013-512844 | 1/2014 |
| WO | WO 00/36674 A2 | 6/2000 |
| WO | WO 2005/069409 A2 | 7/2005 |
| WO | WO 2009/049375 A1 | 4/2009 |
| WO | WO 2010/072715 A1 | 12/2009 |
| WO | WO 2010/072713 A1 | 7/2010 |
| WO | WO 2010/112580 A1 | 10/2010 |
| WO | WO 2010/092109 A3 | 11/2010 |
| WO | WO 2011/039292 A1 | 4/2011 |
| WO | PCT/EP2011/058651 | 8/2011 |
| WO | WO 2011/147924 A1 | 12/2011 |
| WO | PCT/EP2011/058651 | 8/2012 |
| WO | WO 2012/149672 A1 | 11/2012 |

OTHER PUBLICATIONS

Office Action for JP 2013-512844 mailed Oct. 14, 2014.
Chinese Office Action dated Jul. 3, 2014 for Application No. CN 201180026415.0.
Keguo et al., Electrochemical performance of the exfoliated graphite containing sulfur cathode material for lithium sulfur battery. Electrochemistry. May 31, 2009; 15(2):202-205.
European Search Report for Application No. EP 10164339 completed Aug. 26, 2010.
European Intent to Grant for Application No. EP 11723423.7 completed Dec. 12, 2013.
Japanese Office Action for Application No. 2013-512844 mailed Jan. 7, 2014.
International Preliminary Report on Patentability for Application No. PCT/EP2011/058651 mailed Aug. 6, 2012.
International Search Report for Application No. PCT/EP2011/058651 mailed Aug. 11, 2011.
Cao et al., Graphene-sulfur nanocomposite for high-performance lithium-sulfur batteries. Technical program of the 218$^{th}$ ECS Meeting; Abstract 1045. Las Vegas, Nevada. May 8, 2010. <http://ecsmeet3.peerx-press.org/ms_files/ecsmeet3/2010/05/07/00002943/00/2943_0_art_0_122rq9.pdf> Retrieved on Aug. 18, 2010.
Chen et al., Preparation of lower-sulfur content and expandable graphite. Carbon. 1996. 34(12):1599-1603.
Ciallella et al., Expanded graphite offers new opportunities. Plastics Additives and Compounding. May 1, 2008;10(3):40-41.
Evers, et al., Graphene-enveloped sulfur in a one pot reaction: a cathode with good coulombic efficiency and high practical sulfur content. Chem. Commun., 2012, 48, 1233-1235.
Fanous et al., Structure-Related Electrochemistry of Sulfur-Poly(acrylonitrile) Composite Cathode Materials for Rechargeable Lithium Batteries. Chem. Mater. 2011, 23, 5024-5028.
Guo, et al., Sulfur-Impregnated Disordered Carbon Nanotubes Cathode for Lithium-Sulfur Batteries. Nano Lett. 2011, 11, 4288-4294.
Hassoun, et al., A High-Performance Polymer Tin Sulfur Lithium Ion Battery. Angew. Chem. Int. Ed. 2010, 49, 2371-2374.
Ji et al., A highly ordered nanostructured carbon-sulphur cathode for lithium-sulphur batteries. Nature Materials. Jun. 1, 2009;8(6):500-6.
Ji et al., Graphene Oxide as a Sulfur Immobilizer in High Performance Lithium/Sulfur Cells. J. Am. Chem. Soc. 2011, 133, 18522-18525.
Kim et al., Effects of MWNT and GNF on the performance of sulfur electrode for Li/S battery. Materials Science Forum. May 2005;486-7:598-601.
Lai et al., Synthesis and Electrochemical Performance of Sulfur/Highly Porous Carbon Composites. J. Phys. Chem. C 2009, 113, 4712-4716.
Mikhaylik, et al., Increasing Li-S Battery Cycle Life, and Improving Safety, through Application of a Variety of Coating Techniques. Society of Vacuum Coaters. 54$^{th}$ Annual Technical Conference Proceedings. Chicago, IL. Apr. 16-21, 2011. pp. 589-592.
Wang et al., Graphene-Wrapped Sulfur Particles as a Rechargeable Lithium-Sulfur Battery Cathode Material with High Capacity and Cycling Stability. Nano Lett. 2011, 11, 2644-2647.
Wang et al., Sulphur-graphene composite for practical lithium batteries. Meeting abstracts of The 15$^{th}$ International Meeting on Lithium Batteries; Abstract 118. Mar. 12, 2010. <http://ecs-sat.peerx-press.org/ms_files/ecs-sat/2010/02/20/00000613/00/613_0_art_1_kz555r_convrt.pdf> Retrieved on Aug. 18, 2010.
Yang et al., New nanostructured Li2S/silicon rechargable battery with high specific energy. Nano Letters. Feb. 25, 2010;10(4):1486-91.
Yin et al., A novel pyrolyzed polyacrylonitrile-sulfur@MWCNT composite cathode material for high-rate rechargeable lithium/sulfur batteries. J. Mater. Chem., 2011, 21, 6807-6810. Supplementary Materials (4 pages).
Zhang, et al., Enhancement of long stability of sulfur cathode by encapsulating sulfur into micropores of carbon spheres. Energy Environ. Sci., 2010, 3, 1531-1537.
Zheng et al., Novel nanosized adsorbing sulfur composite cathode materials for the advanced secondary lithium batteries. Electrochimica Acta 51 (2006) 1330-1335.
Zheng et al., Hollow Carbon Nanofiber-Encapsulated Sulfur Cathodes for High Specific Capacity Rechargeable Lithium Batteries. Nano Lett. 2011, 11, 4462-4467. Supporting Information (6 pages).
Office Action for JP 2013-512844 mailed Jul. 21, 2015.

* cited by examiner

USE OF EXPANDED GRAPHITE IN LITHIUM/SULPHUR BATTERIES

RELATED APPLICATIONS

This application is a U.S. National Stage application based on International Application No. PCT/EP2011/058651, filed May 26, 2011, which is an application claiming the benefit under 35 U.S.C. §119(e) to U.S. Provisional Application Ser. No. 61/349,229, filed May 28, 2010 and U.S. Provisional Application Ser. No. 61/349,232, filed May 28, 2010, and claims priority to European Application No. 10164341.9, filed May 28, 2010 and European Application No. 10164339.3, filed May 28, 2010, the contents of which are incorporated herein by reference in their entirety.

DESCRIPTION

Figure 1:
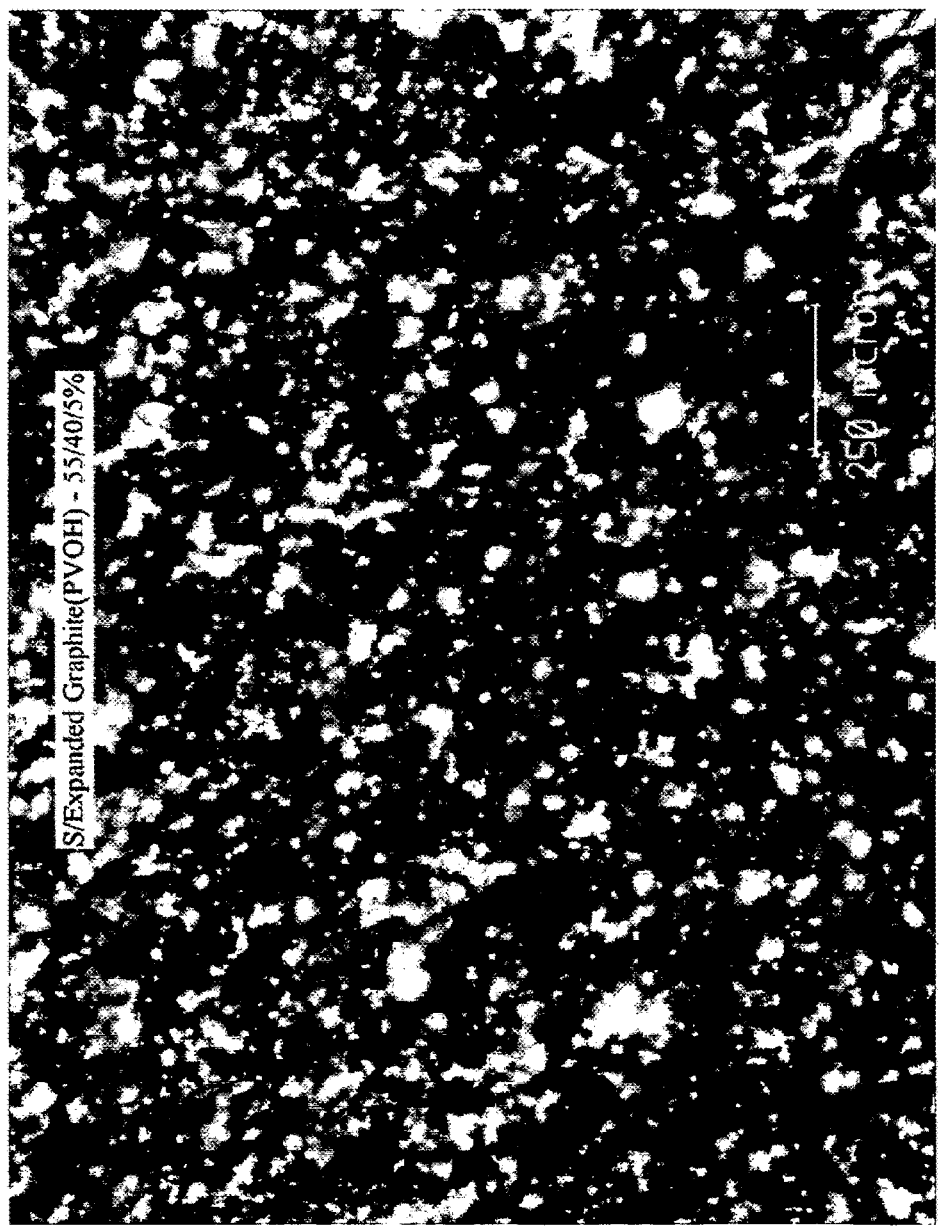
FIG. 1 is an optical microscope image of the cathode described in Example 8.

The present invention relates to a solid composite for the cathode of a lithium-sulphur electric current producing cell wherein the solid composite comprises 1 to 75 wt.-% of expanded graphite and 25 to 99 wt.-% of sulphur, based on the total amount of the solid composite, a lithium-sulphur electric current producing cell comprising (i) a cathode comprising the solid composite, (ii) an anode and (iii) an electrolyte interposed between said cathode and said anode and a process for preparing the solid composite.

There is a high demand for long lasting rechargeable electric current producing cells having high energy density. Such electric current producing cells are used for portable devices as notebooks or digital cameras and will play a major role in the future for the storage of electric energy produced by renewable sources.

At the time being, Li-ion rechargeable batteries are the most common batteries used. A further kind of rechargeable batteries with promising characteristics is the lithium-sulphur (Li/S) battery. In Li/S-batteries, the anode is formed by Li-metal and the cathode is formed by sulphur. In the discharge modus $Li^0$ dissociates into an electron and a $Li^+$-ion which is dissolved in the electrolyte. This process is called lithium stripping. At the cathode the sulphur is initially reduced to polysulfides like $Li_2S_8$, $Li_2S_6$, $Li_2S_4$, and $Li_2S_3$. These polysulfides are soluble in the electrolyte. Upon further reduction $Li_2S_2$ and $Li_2S$ are formed which precipitate.

In the charge modus of the Li/S-battery the $Li^+$-ion is reduced to $Li^0$ at the anode. The $Li^+$-ion is removed from the electrolyte and precipitated on the anode, thereby. This called lithium plating. $Li_2S_2$ and $Li_2S$ are oxidized to polysulfides (like $Li_2S_4$, $Li_2S_6$, and $Li_2S_8$) and sulphur ($S_8$) at the cathode.

Li/S-batteries have a four times higher theoretical specific energy than Li-ion batteries, especially their gravimetric energy density (Wh/kg) is higher than that of Li-ion batteries. This is an important feature for their possible use as rechargeable energy source for automobiles. In addition, the sulphur used as main material in the cathode of the Li/S-batteries is much cheaper than the Li-ion intercalation compounds used in Li-ion batteries.

One problem of Li/S-batteries is the good solubility of the polysulfides in the electrolyte which may diffuse from the cathodic region into the anodic region. There, the polysulfides are reduced to solid precipitates ($Li_2S_2$ and/or $Li_2S$), resulting in a loss of active material at the cathode and therefore decreasing the capacity of the Li/S-battery.

US 2009/0226809 A1 describes Li/S batteries and cathodes wherein the cathode comprises a composition containing 20 to 90 wt.-% of sulfur and 0.01 to 50 wt.-% of a metal oxide like CuO, SnO and ZnO and may further contain a binder and an electrically conductive carbon material like carbon black, synthetic graphite including expanded graphite, graphite nanosheets, graphite nanoplatelets, graphene sheets, non-synthetic graphite (including natural graphite and coke) and graphitized carbon nano-fibres. It is said that the metal oxide contributes in holding polysulfides within the cathode. These compositions have the drawback that the discharge voltage is reduced more or less depending on the metal oxide used. Furthermore, the gravimetric energy density is lower due to the higher density of the transitional metal oxides in comparison with sulfur.

A second major problem is that sulphur itself is an electrically insulating material and therefore an electrically conductive agent is necessary to connect the sulphur with the current collector and current supply, respectively. Furthermore, the sulphur has to be in contact with the electrolyte to be electrochemically active.

Several materials have been suggested as conductive agents in the prior art. For example, US 2004/0058246 A1 describes a positive active material for a Li/S-battery wherein the conductive agent is selected from carbon black, graphite, carbon fibre, carbon nanotubes, activated carbon, a metal powder or metal compound and mixtures thereof.

X. Ji et al., Nature Materials, Vol. 8 (2009), pages 500-506 disclose a highly ordered nanostructured carbon-sulphur cathode for Li—S-batteries. They used mesoporous carbon comprising an assembly of hollow 6.5 nm thick carbon rods separated by empty 3-4 nm wide channel voids (CMK-3) which were filled with sulphur afterwards.

Despite the fact that there has been long and intense research in the field of Li/S-batteries, there is still the need for further improvements of this kind of batteries to obtain Li/S-batteries which are capable of being charged/discharged a high number of cycles without losing too much of their capacity. This is a prerequisite for a widespread commercial use of Li/S-batteries. Furthermore, the percentage of sulphur utilized in the charge/discharge cycles should be increased compared to conventional L/S-batteries.

This object is solved according to the present invention by a solid composite for use in the cathode of a lithium-sulphur electric current producing cell wherein the solid composite comprises 1 to 75 wt.-% of expanded graphite or graphene,
25 to 99 wt.-% of sulphur,
0 to 50 wt.-% of one or more further conductive agents other than expanded graphite, or graphene, respectively and
0 to 50 wt.-% one or more binder,
based on the total amount of the solid composite.
More preferred the solid composite comprises
2 to 60 wt.-% of expanded graphite or graphene,
40 to 98 wt.-% of sulphur,
0 to 40 wt.-% of one or more further conductive agents other than expanded graphite, or graphene, respectively and
0 to 40 wt.-% one or more binder,
based on the total amount of the solid composite, and most preferred the solid composite comprises 5 to 45 wt.-% of expanded graphite or graphene, 55 to 95 wt.-% of sulphur, 0 to 25 wt.-% of one or more further conductive agents other than expanded graphite or graphene, respectively and 0 to 25 wt.-% one or more binder, based on the total amount of the solid composite.

Lithium-sulphur (abbreviated Li/S) electric current producing cells comprising the inventive solid composite can be discharged/charged a high number of cycles without losing too much of their capacity. The inventive solid composite can be charged/discharged with a significant higher sulphur usage compared to conventional sulphur cathodes.

For inventive compositions comprising expanded graphite the sulphur usage at the 5. cycle was about 20% higher (1200 mAh/g) than for the comparative example representing the state of the art (benchmark). The expanded graphite used as a conductive agent combines a high surface area with good electrical conductivity. The expanded graphite has pocket-like voids between its expanded layers. Inside these voids the sulphur and the electrolyte are present. Due to this structure of the expanded graphite the diffusion path of the sulphur becomes longer and the sulphur stays longer in the cathode material. Consequently, the contact of this sulphur via the expanded graphite with the current collector/supply and with the electrolyte is improved. Furthermore, expanded graphite is a very cheap conductive agent in comparison with complicated carbon structures like nanotubes.

For inventive compositions containing graphene the sulphur usage at the 10 cycle was significantly higher (1080 mAh/g) than for the comparative example representing the state of the art (benchmark). The graphene used as a conductive agent combines a high surface area with a high aspect ratio and with high electrical conductivity. The contact of the sulphur via the graphene with the current collector/supply and with the electrolyte is improved. The density of graphene is very low, therefore the cathode keeps better its structure under high pressures. The porosity of the cathode can be improved by using graphene in the solid composite leading to longer cycle stability. This is believed to be caused by the interfolding of the single graphene sheets. Furthermore, graphene is cheaper in comparison with conductive agents with complicated carbon structures like nanotubes.

A further advantage of the present invention is that the use of metal oxide as additive to hold the polysulfides within the cathode is not necessary due to the fact that expanded graphite or graphene, respectively, is used in the composition of the cathode. This allows higher amounts of S to be present in the composition whereby the discharge voltage remains high as well as the specific capacity. Expanded graphite is a low cost raw material and has fewer limitations in respect to environmental aspects as well as graphene. According to a preferred embodiment the inventive composition for the cathode of Li/S current producing cells does not contain metal oxide.

Below the present invention is described in detail.

The term "electric current producing cell" as used herein is intended to include batteries, primary and secondary electrochemical cells and especially rechargeable batteries.

According to the first embodiment of the present invention, the solid composition for use in the cathode of a Li/S electric current producing cell comprises 1 to 75 wt.-%, preferred 2 to 60 wt.-% and more preferred 5 to 45 wt.-% of expanded graphite, based on the total weight of the solid composite.

Graphite is a layered compound formed by carbon atoms, in each layer the carbon atoms are arranged in a hexagonal lattice. By incorporation of ions or molecules like alkali metals (electron donators) or strong Lewis acids (electron acceptors) into the layers intercalation compounds are formed. The layered structure of the graphite is substantially maintained but the distance of the layers is enlarged. Such intercalation compounds of graphite are known in the state of the art.

Expanded graphite is usually produced from a graphitic or partially graphitic starting material selected from the group consisting of natural graphite, pyrolytic graphite, kish graphite, compressed expanded graphite, partially oxidized graphite and graphite fibres. The starting material is reacted with substances capable of intercalation or mixtures of substances capable of intercalation (intercalating material(s)) to give an intercalation compound which subsequently is expanded. Intercalating materials may be halogens, $SO_3$, $NO_3$, alkali metals or other compounds. Preferably the intercalation compound is obtained by treating the starting material, preferably graphite, with a strong acid, preferably concentrated sulphuric acid in combination with an oxidizing agent or with concentrated nitric acid. Organic acids like formic acid or acetic acid are suitable as well. After the treatment with the intercalating material, the intercalated compound, e.g. the intercalated graphite, is washed and/or dried. Processes for preparation of intercalated compounds are known to the person skilled in the art; see for example Chen et al., Carbon Vol. 34, No. 12, 1996, 1599-1603. Intercalated compounds suitable for preparing the expanded graphite comprised in the solid composition according to the present invention are commercially available under the designation expandable graphite, e.g. from NGS Naturgraphit GmbH, Germany, LUH GmbH, Germany and TECHNOGRAFIT GmbH, Germany.

Upon rapid heating of the intercalated compound to 200° C. to about 1000° it reacts by thermal decomposition of the intercalated material like N- or S-compounds and the crystal layers of the graphite are delaminated to release the gaseous decomposition products. The heat treatment may be carried out in an expansion oven, a plasma oven or by means of microwaves, for instance. The volume of the expanded graphite may increase up to 280 times of the starting volume. The expansion volume obtained depends on different parameters, e.g. the particle size of the graphite used, the kind of the starting material (for example natural graphite or synthetic graphite) and the type and velocity of the heating.

The preparation of expanded graphite is known to the person skilled in the art. A description of a method for the preparation of expanded graphite may be found for instance in EP 1,491,497 B1. Expanded graphite is commercially available, e.g. from NGS Naturgraphit GmbH, Germany.

The expandable graphite used to prepare the expanded graphite in the present invention typically contains up to 40 wt.-% of intercalating material and usually has a particle size of 50 µm to 800 µm before expansion determined by sieving. Typically the intercalated compound used for preparing the expanded graphite according to the present invention has an expansion rate of 120 to 350 $cm^3/g$ upon heating and a starting temperature of expansion of 160 to 300° C. After expansion the expanded graphite contains typically at least 85 wt.-%, preferred at least 90 wt.-%, more preferred at least 95 wt.-%, most preferred at least 98 wt.-%, in particular at least 99 wt.-% of carbon.

The surface area of the expanded graphite used in the present invention usually is 100 to 1.000 $cm^2/g$, measured by Hg-porosimetry. Micrographs of the expanded graphite from electron transmission microscopy reveal that the expanded graphite has a layered structure with pockets or pores between the still connected layers. It is preferred according to the present invention that the averaged distance of the boundaries of these pockets or pores is 1 to 5 µm, more preferred 1 to 2 µm. The averaged distance may be determined by SEM (scanning electron microscopy) or Hg-porosimetry.

The expanded graphite may be ground before used for the preparation of the solid composite according to the invention, e.g. in a ball mill.

According to the second embodiment of the present invention the solid composition for use in the cathode of a Li/S electric current producing cell comprises 1 to 75 wt.-%, preferred 2 to 60 wt.-% and more preferred 5 to 45 wt.-% of graphene, based on the total weight of the solid composite.

Strictly speaking, "graphene" denotes an individual planar layer of $sp^2$ bonded carbon atoms wherein the carbon atoms are densely packed in a honeycomb crystal lattice. Stacking graphene layers yields graphite. According to the present invention the term "graphene" is intended to include planar monolayers, bilayers and multilayers up to several dozens of stacked layers of $sp^2$-bonded carbon atoms densely packed in a honeycomb crystal lattice. It is preferred according to the invention that the graphene is composed of 1 to 50, more preferred 1 to 20 planar layers of $sp^2$-bonded carbon atoms. The term "graphene" is also intended to include mixtures of graphene with different numbers of planar $sp^2$-bonded carbon atoms as defined previously.

The graphene used in the inventive solid composite may contain some defects which may be due to the preparation method of the graphene like oxygen containing functional groups, e.g. hydroxy, epoxy, carbonyl and/or carboxy groups from the preparation of the graphene by reducing graphite oxide.

The graphene used according to the present invention may contain up to 5 wt.-% of oxygen, preferred up to 2 wt.-%, of oxygen, based on the total weight of the graphene. There are several methods for preparing graphene known to the person skilled in the art.

One possibility is the chemical exfoliation of graphite, whereby graphite particles are split up into graphene particles in organic solvents like N-methyl-pyrrolidon. This is due to the positive interaction between the solvent and the graphite/graphene surfaces.

Graphene may be prepared by mechanical exfoliation, too. This can be carried out by putting a scotch tape onto a graphite crystal and drawing the scotch tape with the graphene layers attached. The scotch tape with the attached graphene layers is dissolved and after some further steps graphene flakes can be separated.

Another way to obtain graphene particles is the chemical reduction of graphite oxide with reductive agents like hydrazine in aqueous suspension. For example, in WO2009/049375 A1 a process for the preparation of graphene and graphene dispersions is described which comprises reducing purified exfoliated graphite oxide in the presence of a base.

Preferably, the graphene used in the solid composite of the present invention is selected from the group mechanically exfoliated graphene, chemically exfoliated graphene, reduced graphene and nanographite.

Graphene is commercially available in different forms like powder, flakes and dispersions, e.g. Ciba-wet fittercake or Vor-X-Conductuve.

The graphene may be ground before used for the preparation of the solid composite according to the invention, e.g. in a ball mill.

In addition to the expanded graphite (first embodiment) or to the graphene (second embodiment), the solid composite for use in the cathode of a Li/S electric current producing cell further comprises 25 to 99 wt.-% of sulphur, preferred 40 to 98 wt.-% and especially preferred 55 to 95 wt.-% of sulphur, based on the total amount of the solid composite.

It is preferred according to the present invention to use elemental sulphur for the preparation of the solid composite. Usually elemental sulphur is crystalline with $S_8$-molecules at room temperature. n this case the $S_8$-molecule is the theoretical final oxidation state of the sulphur in the Li/S current producing cell. The corresponding theoretical final reduction state of sulphur is $Li_2S$. Sulphur shows complicated redox reactions wherein polysulfides with various chain lengths and different oxidation states are generated.

The sulphides $Li_2S_2$ and $Li_2S$ are normally non-soluble in the electrolyte; the polysulfides formed during the complicated redox reaction are soluble in the electrolyte. As a result, the solid composite for the cathode of a Li/S electric current producing cell may emit a part of the sulphur as polysulfides into the electrolyte during the discharge of the electric current producing cell. The sulphur used for the preparation of the solid composite of the present invention may be milled before the preparation e.g. in a ball mill.

According to the first embodiment of the present invention, the solid composite may further comprise one or more conductive agents other than expanded graphite in addition to the expanded graphite. Preferably, said one or more conductive agents are selected from the group consisting of carbon black, graphite, carbon fibres, graphene, carbon nanotubes, activated carbon, carbon prepared by heat treating cork or pitch, a metal powder, metal flakes, a metal compound or a mixture thereof. The carbon black may include ketjen black, denka black, acetylene black, thermal black and channel black. The metal powder and the metal flakes may be selected from Sc, Ti, V, Cr, Mn, Sn, Ag, Fe, Co, Ni, Cu, Zn, Al, etc. Furthermore, the conductive agent may be electrically conductive polymers and electrically conductive metal chalcogenides.

It is preferred according to the first embodiment of the present invention that the solid composite for use in the cathode of a lithium-sulphur electric current producing cell comprises in addition to the expanded graphite one or more further conductive agents other than expanded graphite. If the one or more further conductive agents other than expanded graphite is present in the composition its concentration is of at least 1 wt.-% up to 50 wt.-%, preferred of at least 2 wt.-% up to 40 wt.-% and most preferred of at least 5 wt.-% up to 25 wt.-%, based on the total amount of the solid composition of the invention. The amount of the one or more further conductive agents other than expanded graphite is preferably selected in such a way, that the weight ratio of the amount of expanded graphite and the amount of the one or more conductive agents other than expanded graphite is at least 1:50, preferred at least 1:5.

According to the second embodiment of the present invention the solid may further comprise one or more conductive agents other than graphene in addition to the graphene. Preferably, said one or more conductive agents are selected from the group consisting of carbon black, graphite, expanded graphite, carbon fibres, carbon nanotubes, activated carbon, carbon prepared by heat treating cork or pitch, a metal powder, metal flakes, a metal compound or a mixture thereof. The carbon black may include ketjen black, denka black, acetylene black, thermal black and channel black. The metal powder and the metal flakes may be selected from Sc, Ti, V, Cr, Mn, Sn, Ag, Fe, Co, Ni, Cu, Zn, Al, etc. Furthermore, the conductive agent may be electrically conductive polymers and electrically conductive metal chalcogenides.

It is preferred according to the second embodiment of the present invention that the solid composite of the invention for use in the cathode of a lithium-sulphur electric current producing cell comprises in addition to the graphene one or more further conductive agents other than graphene. If the one or more further conductive agents other than graphene is present in the composition its concentration is of at least 1 wt.-% up to 50 wt.-%, preferred of at least 2 wt.-% up to 40 wt.-% and most preferred of at least 5 wt.-% up to 25 wt.-%, based on the total amount of the solid composition of the invention. The amount of the one or more further conductive agents other than graphene is preferably selected in such a way, that the weight ratio of the amount of graphene and the amount of the one or more conductive agents other than graphene is at least 1:50, preferred at least 1:5. According to the present invention the solid composite optionally further comprises one or more binder. The binder binds the sulphur, the expanded graphite or the grapheme, respectively and optionally the one or more conductive agents tightly as network to maintain the conductive network structure of the solid composite and to bind the solid composite to the current collector/supply. The one or more binder are preferably selected from the group consisting of polyvinylacetate, polyvinylalcohol, polyethylene oxide, polyvinyl pyrrolidone, alkylated polyethylene oxide, cross linked polyethylene oxide, polyvinyl ether, poly(methyl methacrylate), polyvinylidene fluoride, a copolymer of polyhexafluoropropylene and polyvinylidene fluoride, poly(ethyl acrylate), polytetrafluoroethylene, polyvinyl chloride, polyacrylonitrile, polyvinylpyridine, polystyrene, polypyrrole, polythiophene, derivatives thereof, blends thereof, and copolymers thereof.

Preference is given according to the invention, to solid composites comprising one or more binder. The amount of binder may vary widely. If one or more binder is present, the amount of binder may be from 0.1 to 50 wt.-% preferred from 0.5 to 40 wt.-% and more preferred from 1 to 25 wt.-%.

In a further embodiment of the invention, the amount of the one or more binder is from 0.1 to 15 wt.-%, preferred from 0.5 to 12 wt.-%, and more preferred 1 to 10 wt.-%, based on the total weight of the solid composite.

According to the first embodiment of the invention the solid composite preferably comprises expanded graphite one or more further conductive agents other than expanded graphite and one or more binder.

According to the second embodiment of the invention, the solid composite preferably comprises graphene, one or more further conductive agents other than graphene and one or more binder.

Further the solid composite according to the invention may comprise one or more electrolytes. The one or more electrolytes preferably comprise one or more material selected from the group consisting of liquid electrolytes, gel polymer electrolytes, and solid polymer electrolyte. More preferred, the one or more electrolytes comprise
 (a) one or more ionic electrolyte salts; and
 (b) one or more polymers selected from the group consisting of polyethers, polyethylene oxides, polypropylene oxides, polyimides, polyphophazenes, polyacrylonitriles, polysiloxanes; derivatives thereof, blends thereof, and copolymers thereof; and/or
 (c) one or more electrolyte solvents selected from the group consisting of N-methyl acetamide, acetonitrile, carbonates, sulfolanes, sulfones, N-substituted pyrrolidones, acyclic ethers, cyclic ethers, xylene, polyether including glymes, and siloxanes.

The one or more ionic electrolyte salts are preferably selected from the group consisting of lithium salts including lithium cations, salts including organic cations, or a mixture thereof.

Examples of lithium salts include $LiPF_6$, $LiBF_4$, $LiB(C_6H_5)_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (wherein x and y are natural numbers), LiSCN, LiCl, LiBr and LiI.

Examples for organic cation included salts are cationic heterocyclic compounds like pyridinium, pyridazinium, pyrimidinium, pyrazinium, imidazolium, pyrazolium, thiazolium, oxazolium, pyrolidinium, and triazolium, or derivatives thereof. Examples for imidazolium compounds are 1-ethyl-3-methyl-imidazolium (EMI), 1,2-dimethyl-3-propylimidazolium (DMPI), and 1-butyl-3-methylimidazolium (BMI). The anion of the organic cation including salts may be bis(perfluoroethylsulfonyl)imide ($N(C_2F_5SO_2)_2^-$, bis(trifluoromethylsulfonyl)imide($NCF_3SO_2)_2^-$), tris(trifluoromethylsulfonylmethide($C(CF_3SO_2)_2^-$, trifluoromethansulfonimide, trifluoromethylsulfonimide, trifluoromethylsulfonat, $AsF_6^-$, $ClO_4^-$, $PF_6^-$, $BF_4^-$, $B(C_6H_5)_4^-$, $SbF_6^-$, $CF_3SO_3^-$, $C_4F_9SO_3^-$, $AlO_4^-$, $AlCl_4^-$, $[N(C_xF_{2x+1}SO_2)][(C_yF_{2y+1}SO_2)]$ (wherein x and y are natural numbers), $SCN^-$, $Cl^-$, $Br^-$ and $I^-$.

Furthermore, the electrolyte may contain ionic N—O electrolyte additives as described in WO 2005/069409 on page 10. Preferably according to the present invention, the electrolyte contains $LiNO_3$, guanidine nitrate and/or pyridinium nitrate.

According to the present invention the electrolyte salts are preferably selected from the group consisting of $LiCF_3SO_3$, $Li(CF_3SO_2)_2N$, $LiC_4F_9SO_3$ and LiI.

The one or more electrolyte solvents are non-aqueous according to the invention.

Glymes comprise diethylene glycol dimethylether (diglyme), triethylenglycol dimethyl ether (triglyme), tetraethylene glycol dimethylether (tetraglyme) and higher glymes. Polyethers comprise glymes, ethylene glycol divinyl ether, diethylene glycol divinyl ether, triethylene glycol divinyl ether, dipropylene glycol dimethyl ether, and butylenes glycol ethers.

Acylic ethers include dimethylether, dipropyl ether, dibutylether, dimethoxy methane, trimethoxymethane, dimethoxyethane, diethoxymethane, 1,2-dimethoxy propane, and 1,3-dimethoxy propane.

Cyclic ethers comprise tetrahydrofuran, tetrahydropyran, 2-methyltetrahydrofuran, 1,4-dioxane, trioxane, and dioxolanes.

The one or more solvents may be mixtures of two or more solvents.

The one or more electrolyte solvents are preferably selected from the group consisting of dioxolanes and glymes.

Most preferred the one or more electrolyte comprise
 (a) one or more ionic electrolyte salts; and
 (c) one or more electrolyte solvents selected from the group consisting of N-methyl acetamide, acetonitrile, carbonates, sulfolanes, sulfones, N-substituted pyrrolidones, acyclic ethers, cyclic ethers, xylene, polyether including glymes, and siloxanes.

A further object of the present invention is a lithium-sulphur electric current producing cell comprising
 (i) a cathode comprising the solid composite as described above, (ii) an anode,
(iii) an electrolyte interposed between said cathode and said anode.

The cathode of the inventive lithium-sulphur electric current producing cell comprises the inventive solid composite described above.

Furthermore, the lithium-sulphur electric current producing cell according to the present invention contains an anode, wherein the anode comprises one or more anode-active materials selected from the group consisting of lithium metal; lithium containing alloys like lithium-aluminium alloys, lithium-tin alloys, Li—Mg-alloys, Li—Ag-alloys; lithium-intercalated carbons; and lithium-intercalated graphite. All these materials are capable of reversibly intercalating lithium ions as $Li^0$ or reversibly reacting with lithium ions to form a lithium)($Li^0$ containing compound, a lithium alloy and/or a lithium metal. Lithium intercalating carbon materials are capable of reversibly intercalating and deintercalating lithium ions. These materials usually include crystalline carbon, amorphous carbon, or a mixture thereof.

Furthermore, the inventive lithium-sulphur electric current producing cell comprises an electrolyte interposed between the cathode and the anode. The electrolytes function as a medium for the storage and transport of ions. The electrolyte may be a solid phase or a liquid phase. Any ionic conductive material can be used as long as the ionic conductive material is electrochemical stable. Suitable electrolytes are the electrolytes described above.

If the lithium-sulphur electric current producing cell comprises a solid or a gel polymer electrolyte, this solid/gel polymer electrolyte acts as separator separating mechanically the anodic region from the cathodic region and serves as well as a medium to transport metal ions. The solid electrolyte separator may comprise a non-aqueous organic solvent. In this case the electrolyte may further comprise a suitable gelling agent to decrease the fluidity of the organic solvent.

The Li/S electric current producing cell according to the present invention may further contain a separator between the anodic and the cathodic region of the cell. This is especially preferred if the electrolyte is a liquid phase. Typically, the separator is a porous non-conductive or insulative material which separates or insulates the anodic and the cathodic region from each other and which permits the transport of ions through the separator between the anodic and the cathodic region of the cell. The separator is usually selected from the group consisting of porous glass, porous plastic, porous ceramic and porous polymer separators.

In a preferred embodiment of the invention the lithium-sulphur electric current producing cell further comprises a current collector which further acts as current supply in the charge modus of the electric current producing cell. The current collector/current supply may be prepared from conductive materials like stainless steel, aluminium, copper or titanium.

A further object of the present invention is a process for preparing the solid composite of the present invention comprising the steps (I) preparing a slurry comprising sulphur, expanded graphite or graphene, respectively and optionally further components in a liquid medium by dispersing the sulphur, the expanded graphite or graphene, respectively, and optionally the further components in the liquid medium;

(II) casting the slurry provided in step (I) on a substrate or placing the slurry provided in step (I) into a mold; and (III) removing some or all of the liquid medium from the slurry cast in step (II) to form a solid composite.

According to the first embodiment of the present invention, the sulphur, the expanded graphite, optionally the one or more conductive agent other than expanded graphite, optionally the binder and optionally further additives like a dispersing agent are mixed with a solvent. The sulphur, the expanded graphite and the optional one or more conductive agents other than expanded graphite may be ground alone or together before preparing the slurry. It is also possible to prepare a mixture of a solvent, sulphur and/or expanded graphite and/or the optional one or more conductive agent other than expanded graphite and to wetmill this mixture before further processing. The binder may be added as solution or in substance. It is also possible to add an dispersing agent to obtain a homogeneous slurry. The liquid medium for preparing the slurry may be water or an organic solvent like alcohols, ethers or mixtures of organic solvents and may contain water.

Instead of mixing the sulphur and/or the expanded graphite and/or the optional one or more conductive agent other than expanded graphite mechanically by milling, it is also possible to prepare a mixture containing sulphur and/or expanded graphite and/or the optional one or more conductive agents other than expanded graphite by melting these ingredients and milling the cooled solid mixture before using the mixture in step (I) to prepare the slurry in the process for preparing the solid composite.

According to the second embodiment of the present invention, the sulphur, the graphene, optionally the one or more conductive agent other than graphene, optionally the binder and optionally further additives like a dispersing agent are mixed with a solvent. The sulphur, the graphene and the optional one or more conductive agents other than graphene may be ground alone or together before preparing the slurry. It is also possible to prepare a mixture of a solvent, sulphur and/or graphene and/or the optional one or more conductive agent other than graphene and to wetmill this mixture before further processing. The binder may be added as solution or in substance. It is also possible to add a dispersing agent to obtain a homogeneous slurry. The liquid medium for preparing the slurry may be water or an organic solvent like alcohols, ethers or mixtures of organic solvents and may contain water.

Instead of mixing the sulphur and/or the graphene and/or the optional one or more conductive agent other than graphene mechanically by milling, it is also possible to prepare a mixture containing sulphur and/or graphene and/or the optional one or more conductive agents other than graphene by melting these ingredients and milling the cooled solid mixture before using the mixture in step (I) to prepare the slurry in the process for preparing the solid composite.

In step (II) of the preparation process of the solid composite the slurry provided in step (I) is casted on a substrate or placed into a mould. Preferably, the slurry is casted on the current collector/supply of an electric current producing cell.

In step (III) the casted slurry or the slurry placed into a mould is dried, this means some or all of the liquid medium from the slurry is removed to form a solid composite. This is usually carried out at temperatures from 20 to 200° C., preferred from 40 to 120° C.

Below the present invention is explained by examples.

EXAMPLE 1

Solid Composite Comprising S and Expanded Graphite Prepared by Melting and Milling 1.0 g expanded graphite (EX TD 98 320 250 20 SC, NGS Naturgraphit GmbH, Germany) and 10 g of sulphur were mixed and the sulphur was crushed. The mixture was homogenized carefully in a mortar and was heated at 150° C. for 6 hours. A homogeneous composite of grey colour was formed. Afterwards, the composite was milled and a slurry with the mixture of graphite and sulphur and the other components in a solvent (65 wt-% $H_2O$, 30 wt.-% isopropanol, 5 wt-% 1-methoxy-2-propanol) was prepared.

EXAMPLE 2

Solid Composite Comprising S, Carbon Black, and Expanded Graphite, Prepared by Melting and Milling 1.0 g expanded graphite (ES 100 C 10, NGS Naturgraphit GmbH, Germany), 2.0 g carbon black (Super P) and 7 g of elemental sulphur were mixed, wherein the sulphur and the carbon black were crushed. The mixture was homogenized carefully in a mortar and was heated to 150° C. for six hours. A composite of grey colour was formed. Afterwards the composite was milled and a slurry of the mixture with the other components in a solvent was prepared (65 wt-% $H_2O$, 30 wt.-% isopropanol, 5 wt-% 1-methoxy-2-propanol).

EXAMPLE 3

Solid Composite Comprising S, Carbon Black, Expanded Graphite, and Binder

A slurry of 3.032 g of elemental sulphur, 0.804 g of carbon black (Super P), 0.021 g of expanded graphite (EX 350 F5, Kropfmühl AG, Germany) and 0.04 g of a polyvinylalcohol in a solvent (65 wt-% $H_2O$, 30 wt.-% isopropanol, 5 wt-% 1-methoxy-2-propanol) was prepared.

The slurry was casted on Al foil and dried for 15 h at 60° C.

The solid composite comprised 74.4 wt.-% of sulphur, 4.9 wt.-% of expanded graphite, 19.7 wt.-% of carbon black and 1.0 wt.-% of binder.

EXAMPLE 4

Solid Composite Comprising S, Carbon Black, Expanded Graphite, and Binder 3.166 g of the composite of example 1, 0.807 g of carbon black (Super P) and 0.04 g of polyvinylalcohol binder were dispersed in a solvent (65 wt-% $H_2O$, 30 wt.-% isopropanol, 5 wt-% 1-methoxy-2-propanol). The slurry was casted on Al foil.

The solid composite comprised 71.0 wt.-% of sulphur, 7.89 wt.-% of expanded graphite, 20.11 wt.-% of carbon black and 1.0 wt.-% of binder, based on the total weight of the solid composite.

EXAMPLE 5

(Inventive): Solid Composite Containing S, Expanded Graphite, Carbon Black and Binder 2.003 g of the composite of example 2 and 0.02 g of polyvinylalcohol binder were dispersed in water. The slurry was casted on a substrate (Al foil) and dried for 15 h at 60° C.

The solid composite comprised 69.3 wt.-% of sulphur, 19.8 wt.-% of carbon black, 9.9 wt.-% of expanded graphite and 0.99 wt.-% of binder, based on the total weight of the solid composite.

EXAMPLE 6

(Comparison, Benchmark): Solid Composite Containing S, Carbon Black, Graphite and Binder A slurry of 3.032 g of elemental sulphur, 0.804 g of carbon black (Super P), 0.021 g of graphite (Timcal KS6) and 0.04 g of a polyvinylalcohol (Celanese) in a solvent (65 wt.-% $H_2O$, 30 wt.-% isopropanol, 5 wt.-% 1-methoxy-2-propanol) was prepared. The slurry was casted on Al foil and dried for 15 h at 60° C.

The solid composite comprised 74.4 wt.-% of sulphur, 4.9 wt.-% of graphite, 19.7 wt.-% of carbon black and 1.0 wt.-% of binder.

EXAMPLE 7

Testing the Solid Composite as Anodic Material

An electrochemical cell comprising a Li—S-anode prepared from the solid composites according to examples 3 to 5 (inventive), respectively, and a sulphur cathode including a porous polyolefin separator (15 µm thickness, Tonen, Exxon). The electrolyte used was composed of 8 wt.-% of LiTFSl ($LiN(SO_2CF_3)_2$), 4 wt.-% of $LiNO_3$, 44 wt.-% of Dioxolan and 44 wt.-% of Dimethoxyethan.

The discharge-charge cycling of the cells was performed at 11 mA with discharge cut at a voltage of 1.7 V and charge cut off 2.5 V. the cell capacity was about 110 m Ah. The cycling was carried out at room temperature. The results are shown in table 1.

TABLE 1

| example | capacity 5. cycle [mAh/g S] | capacity 10. cycle [mAh/g S] |
|---|---|---|
| 6 (comparison) benchmark | 920 | 880 |
| 3 (inventive) | 1200 | 1050 |
| 4 (inventive) | 1050 | 1050 |
| 5 (inventive) | 1300 | 1100 |

EXAMPLE 8

Microscopy

Cathode slurry made from Sulphur (55% wt.), Expanded Graphite (EG-H-218/A) (40% wt.) and Polyvinyl alcohol (5% wt.) as a binder in water/i-propanol (3:2) media was coated onto 12 µm Al foil with 2 µm Sion primer. Cathode was first dried at room temperature and then in the oven at 85-125° C. Loading of active cathode material was 1.79 mg/cm$^2$, thickness of cathode was 60 µm. An optical microscope image of this cathode is shown in FIG. 1.

EXAMPLE 9

(Comparative): Solid Composite Comprising S, Carbon Black and Binder 5.5 g of sulphur, 1.75 g of carbon black 1 (Printex XE2, Degussa), 1.75 g of carbon black 2 (Vulcan XC72R, Cabot)

and 1.00 g of Teflonbinder were dispersed in a solvent (65 wt.-% $H_2O$, 30 wt.-% isopropanol, 5 wt.-% 1-methoxy-2-propanol). The slurry was casted on Al foil.

The solid composite comprised 55.0 wt.-% of sulphur, 17.5 wt.-% of carbon black 1, 17.5 wt.-% of carbon black 2 and 10 wt.-% of binder, based on the total weight of the solid composite.

EXAMPLE 10

Inventive 7.15 g of sulphur, 3.2 g of carbon black (Vulcan XC72R, Cabot), 1.95 g of graphene (Vor-X-Conductive 050) and 0.65 g of polyvinylalcohol binder were dispersed in a solvent (65 wt-% $H_2O$, 30 wt.-% isopropanol, 5 wt-% 1-methoxy-2-propanol). The slurry was casted on Al foil.

The solid composite comprised 55.0 wt.-% of sulphur, 25 wt.-% of carbon black, 15 wt.-% of graphene and 5 wt.-% of binder, based on the total weight of the solid composite.

EXAMPLE 11

Inventive 11.55 g of sulphur, 4.20 g of graphene (Vor-X-Conductive 050), 2.1 g of carbon black (Vulcan XC72R), and 2.1 g of polyvinylalcohol binder were dispersed in a solvent (65 wt-% $H_2O$, 30 wt.-% isopropanol, 5 wt-% 1-methoxy-2-propanol). The slurry was casted on Al foil.

The solid composite comprised 58.0 wt.-% of sulphur, 10.5 wt.-% of carbon black, 20 wt.-% of (graphene) and 10.5 wt.-% of binder, based on the total weight of the solid composite.

EXAMPLE 12

Testing the Solid Composite as Cathode Material

An electrochemical cell comprising a cathode prepared from the solid composites according to examples 9 to 11 (comparative and inventive), respectively, and a lithium anode including a porous polyolefin separator (15 µm thickness, Tonen, Exxon). The electrolyte used was composed of 8 wt.-% of LiTFSl ($LiN(SO_2CF_3)_2$), 4 wt.-% of $LiNO_3$, 44 wt.-% of Dioxolan and 44 wt.-% of Dimethoxyethan.

The discharge-charge cycling of the cells was performed at 11 mA with discharge cut off at a voltage of 1.7 V and charge cut off off 2.5 V. The cell capacity was about 110 m Ah. The cycling was carried out at room temperature. The results are shown in table 2.

TABLE 2

| example | capacity 5. cycle [mAh/g S] | capacity 10. cycle [mAh/g S] |
|---|---|---|
| 9 (comparison), Benchmark | 650 | 600 |
| 10 (inventive) | 1000 | 1080 |
| 11 (inventive) | 800 | 900 |

EXAMPLES 13 to 16

Mixtures containing 0.02 g polyvinylalcohol, 16.0 g water/isopropanol, [w] g carbon black (Super P, Timcal AG, Switzerland), [x] g synthetic graphite (KS-6, Timcal AG, Switzerland), [y] g expanded graphite (200 95 40 SC, NGS Natur Graphit GmbH, Germany) and [z] g sulphur were prepared. The exact values for [w], [x], [y] and [z] are listed in table 3a), the resulting solid compositions after removing of the water and the isopropanol are shown in table 3b).

TABLE 3 a)

| example | carbon black [w] [g] | graphite [x] [g] | expanded graphite [y] [g] | S [z] [g] | PVOH [g] |
|---|---|---|---|---|---|
| 13 (inventive) | 0.47 | 0.07 | 0.61 | 0.95 | 0.02 |
| 14 (inventive) |  | 0.07 | 0.98 | 0.94 | 0.02 |
| 15 (inventive) |  |  | 1.03 | 0.97 | 0.02 |
| 16 (comparision) | 1.15 | 0.07 |  | 0.93 | 0.02 | b)

| example | carbon black [wt.-%] | graphite [wt.-%] | expanded graphite [wt.-%] | S [wt.-%] | PVOH [wt.-%] |
|---|---|---|---|---|---|
| 13 (inventive) | 22.00 | 3.30 | 28.77 | 44.81 | 0.94 |
| 14 (inventive) | 0.00 | 3.48 | 48.76 | 44.34 | 0.94 |
| 15 (inventive) | 0.00 | 0.00 | 50.99 | 45.75 | 0.94 |
| 16 (comparision) | 53.00 | 3.23 | 0.00 | 43.87 | 0.94 |

[wt.-%]: weight percent based on the total weight of the solid composition after removing the water and the isopropanol used for preparation the composition.

Each mixture was transferred into a ball mill (stainless steel, pulverisette, Fritsch GmbH, Germany) and was milled for 30 minutes at 300 rounds/minutes with balls of stainless steels. A very homogenous ink with a creamy texture was obtained. The ink was airbrushed onto aluminium foil on a vacuum table at 60° C. Nitrogen gas was used for airbrushing. The aluminium foil was covered by 2.9 mg/cm² of the solid composition.

From the aluminium foils obtained electrochemical cells were prepared. In each case the anode was lithium foil with a thickness of 50 µm, the separator was Celgard® 2340 (trilayered polypropylene/polyethylene/polypropylene battery separator from Celgard, N.C, USA) with a thickness of 38 µm, the aluminium foils obtained as described above were used as cathode. The electrolyte was a one-molar solution of $LiN(SO_2CF_3)_2$ in a 1:1 mixture of dioxolane and dimethoxyethane containing 2 wt.-% of $LiNO_3$.

The cells were tested with a current of 7.50 mA and at an electric voltage of between 1.8 and 2.5 V. The results are shown in table 4.

TABLE 4

| example | capacity 5. cycle [mAh/g S] | capacity 10. cycle [mAh/g S] | capacity 50. cycle [mAh/g S] |
|---|---|---|---|
| 16 (comparison) | 1150 | 810 | — |
| 13 (inventive) | 1200 | 1150 | 1000 |
| 14 (inventive) | 1150 | 1100 | 950 |
| 15 (inventive) | 980 | 910 | 720 |

The Li/S current producing cell comprising the comparative composition containing as major conductive agent carbon black and a small amount of synthetic graphite (no expanded graphite, example 16) shows a rapid decrease of its capacity. The Li/S current producing cell comprising the composition containing only expanded graphite (example 15) shows a much smaller decrease of its capacity during the testing cycles. The best results were obtained by the inventive compositions containing expanded graphite and synthetic graphite (example 14) or expanded graphite, carbon black and synthetic graphite (example 15). In all 4 examples the cathode contained a similar amount of S and binder. The discrepancy of the capacity after the $5^{th}$ cycle between comparative examples 16 and 6 are likely due to the higher amount of conductive agents present in example 16 (about 55 wt.-% in comparison to about 25 wt.-% in example 6) leading to a better contact of the sulphur with the conductive agents present in the composition.

Figure 2:
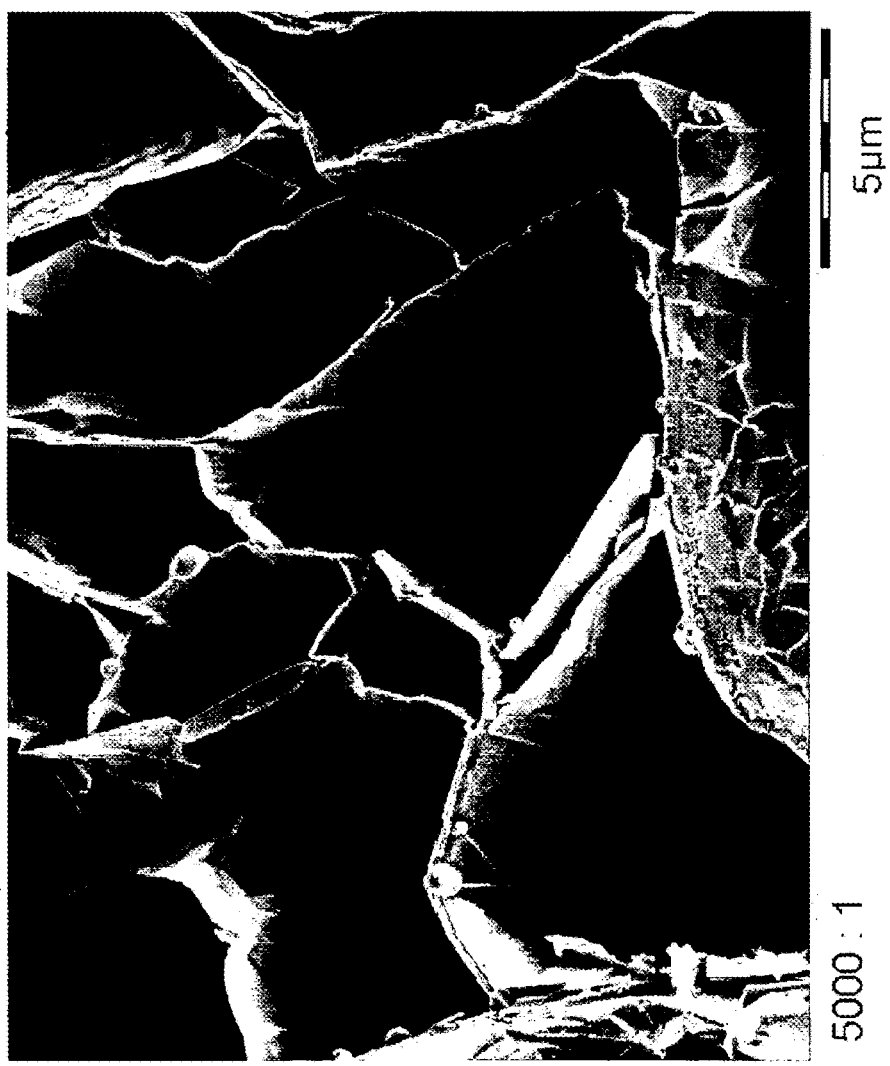
FIG. 2 is an electromicrograph of the expanded graphite used in the examples.

An electromicrograph of the expanded graphite used in the examples presented above is shown in FIG. 2. As can be seen, the expanded graphite has a pore size of from 1 to 5 μm.

The invention claimed is:

1. A solid composite for use in a cathode of a lithium-sulphur electric current producing cell wherein the solid composite comprises
   1 to 75 wt.-% of expanded graphite,
   25 to 99 wt.-% of sulphur,
   1 to 50 wt.-% of one or more further conductive agents other than expanded graphite, and
   0 to 50 wt.-% one or more binder,
   based on the total amount of the solid composite.

2. The solid composite according to claim 1 wherein the solid composite comprises
   5 to 45 wt.-% of expanded graphite,
   55 to 95 wt.-% of sulphur,
   1 to 50 wt.-% of one or more further conductive agents other than expanded graphite, and
   0 to 25 wt.-% one or more binder,
   based on the total amount of the solid composite.

3. The solid composite according to claim 1 wherein the distance between expanded layers of the expanded graphite has an average value of 1 to 5 micrometer.

4. The solid composite according to claim 1 comprising 5 to 25 wt.-% of the one or more further conductive agents other than expanded graphite based on the total amount of the solid composite.

5. The solid composite according to claim 4 wherein the one or more further conductive agents are selected from the group consisting of carbon black, graphite, graphene, carbon fibres, carbon nanotubes, activated carbon, carbon prepared by heat-treating cork or pitch, metal flakes, a metal powder, a metal compound, and mixtures thereof.

6. The solid composite according to claim 1 wherein the solid composite further comprises one or more binder.

7. The solid composite according to claim 6 wherein the one or more binder is selected from the group consisting of polyvinylacetate, polyvinylalcohol, polyethylene oxide, polyvinyl pyrrolidone, alkylated polyethylene oxide, cross linked polyethylene oxide, polyvinyl ether, poly(methyl methacrylate), polyvinylidene fluoride, a copolymer of polyhexafluoropropylene and polyvinylidene fluoride, poly(ethyl acrylate), polytetrafluoroethylene, polyvinyl chloride, polyacrylonitrile, polyvinylpyridine, polystyrene, polypyrrole, polythiophene, derivatives thereof, blends thereof, and copolymers thereof.

8. The solid composite according to claim 1 wherein the solid composite further comprises one or more electrolytes.

9. A lithium-sulphur electric current producing cell comprising
   (i) a cathode comprising the solid composite according to claim 1,
   (ii) an anode,
   (iii) an electrolyte interposed between said cathode and said anode.

10. The lithium-sulphur electric current producing cell according to claim 9 wherein the anode comprises one or more anode active materials selected from the group consisting of lithium metal; lithium containing alloys; lithium-intercalated carbons; and lithium-intercalated graphite.

11. The lithium-sulphur electric current producing cell according to claim 9 wherein the electrolyte comprises one or more materials selected from the group consisting of liquid electrolytes, gel polymer electrolytes, and solid polymer electrolytes.

12. The lithium-sulphur electric current producing cell according to claim 9 wherein the electrolyte comprises
   (a) one or more ionic electrolyte salts; and
   (b) one or more polymers selected from the group consisting of polyethers, polyethylene oxides, polypropylene oxides, polyimides, polyphophazenes, polyacrylonitriles, polysiloxanes; derivatives thereof, blends thereof, and copolymers thereof; and/or
   (c) one or more electrolyte solvents selected from the group consisting of N-methyl acetamide, acetonitrile, carbonates, sulfolanes, sulfones, N-substituted pyrrolidones, acyclic ethers, cyclic ethers, xylene, polyether including glymes, and siloxanes.

13. The lithium-sulphur electric current producing cell according to claim 9 wherein the cathode further comprises a current collector.

14. The lithium-sulphur electric current producing cell according to claim 9 wherein the cell further comprises a separator between the anode and the cathode.

15. The lithium-sulphur electric current producing cell according to claim 10 wherein the lithium containing alloy comprises at least one of a lithium-aluminum alloy, a lithium-tin alloy, a lithium magnesium alloy, and a lithium silver alloy.

* * * * *